LOUIS A. MASON
INVENTOR.

BY J. T. Chabsty
AGENT

United States Patent Office 3,439,724
Patented Apr. 22, 1969

3,439,724
METHOD AND APPARATUS FOR THE CONCENTRATION OF DILUTE BLACK LIQUOR
Louis A. Mason, Williston Park, N.Y., assignor to Chemical Construction Corporation, New York, N.Y., a corporation of Delaware
Filed Aug. 23, 1965, Ser. No. 481,682
Int. Cl. B01d 1/14
U.S. Cl. 159—13                              4 Claims

ABSTRACT OF THE DISCLOSURE

Hot flue gas derived from the combustion of wood pulp black liquor is processed by method and apparatus which initially contacts the hot gas stream with concentrated black liquor and then with dilute black liquor.

---

Figure 1:
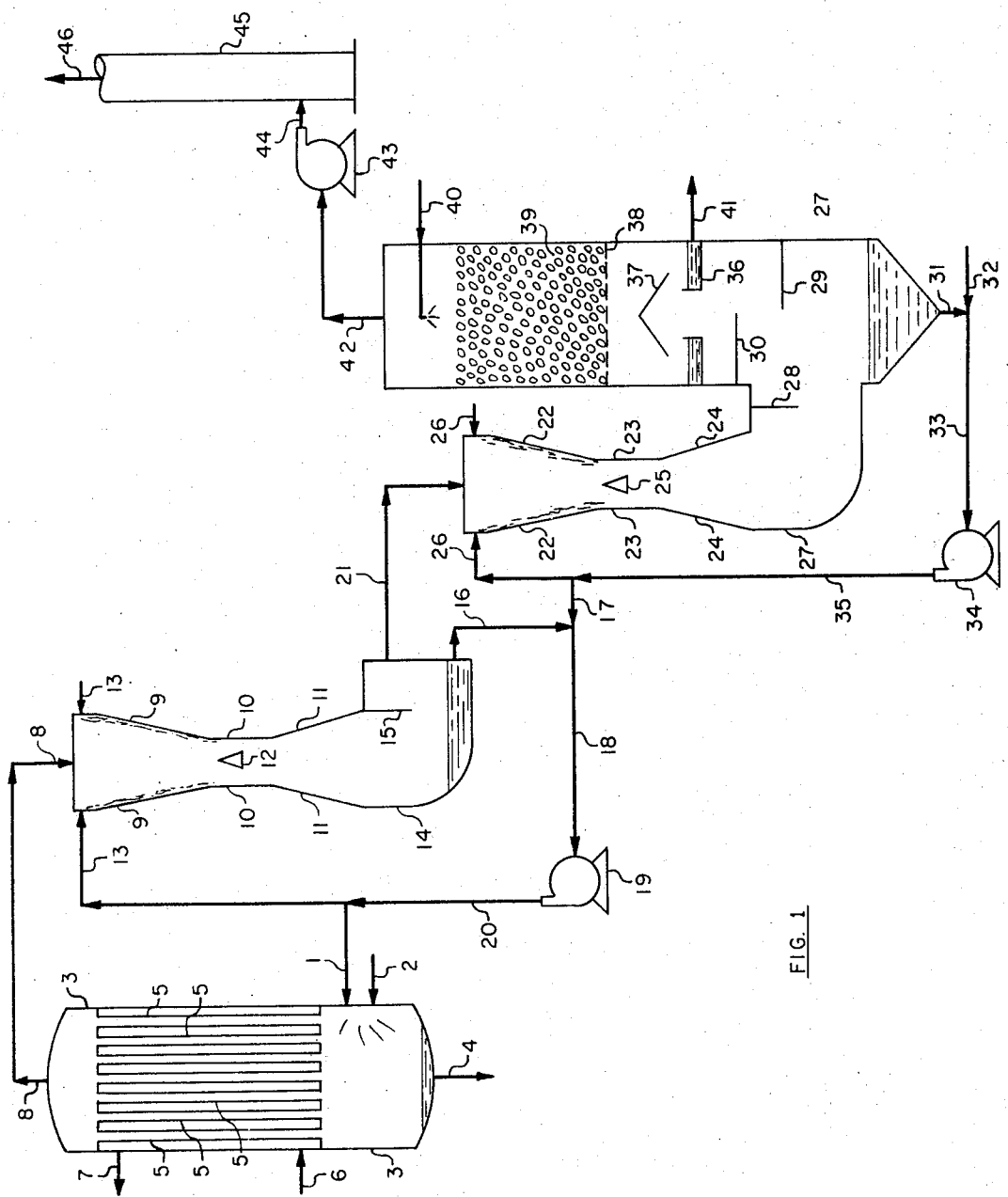

The present invention relates to the processing of residual pulp liquor, also know as black liquor, which is produced as a residual liquid derived from the chemical digestion of cellulose-containing material. An improved method and apparatus are provided for concentrating such residual liquors, to produce a combustion-supporting concentrated liquor, and concomitantly recovering heat and chemicals from the hot waste gas produced by combustion of the concentrated liquor. The residual liquor is concentrated by being projected into the high velocity hot waste gas stream in a novel manner, by means of which a dispersion of the residual liquor into droplets distributed in the waste gas stream is attained. This results in a concentration of the residual liquor by evaporation of water from the droplets into the waste gas stream. The waste gas stream is thus at least partially cooled, and in addition entrained solid chemical particles are recovered from the waste gas stream by being dissolved into the liquid droplets. Further heat recovery from the partially cooled waste gas stream is also attained in a novel manner, by contacting the waste gas stream with a stream of process water, which is thereby heated prior to process usage, such as in the chemical digestion of further cellulose-containing material.

The chemical digestion of cellulose-containing material is carried out for various purposes, such as the processing of wood pulp in paper manufacture. The digestion process is carried out by treating an aqueous slurry of cellulose-containing material such as wood pulp with various chemicals such as sodium sulfate or sodium carbonate at elevated temperature. Various organic chemical constituents are dissolved from the wood pulp into the aqueous solution, leaving a purified solid cellulose which is separated from the aqueous solution and further processed to produce a final product such as paper. The residual aqueous solution or liquor, commonly termed black liquor, thus contains organic constituents derived from the wood pulp as well as valuable chemicals which are recovered for re-use in the digestion process. In the specification and claims infra, reference to residual liquor will be understood to generally encompass residual liquor as derived from the chemical digestion of cellulose-containing material, either in its original dilute state or as a concentrated solution produced by evaporation of water vapor from the dilute residual liquor. The residual liquor is usually processed for recovery of thermal values and chemicals by partial evaporation of water content, to produce a concentrated liquor typically containing from 60% to 68% dissolved solids content, which is capable of supporting combustion. The concentrated liquor is then burned in a specialized steam boiler, to produce usable process steam and recover most of the dissolved chemicals as a molten stream or melt, which is tapped off from the steam boiler and is subsequently cooled and re-used in further chemical digestion of wood pulp. The steam boiler also produces a hot waste gas stream containing solid entrained chemical particles. The hot waste gas stream cannot be directly discharged to atmosphere, since the entrained solid chemical particles are valuable and must be recovered, and in addition discharge of the hot waste gas stream without treatment would result in air pollution. The hot waste gas stream also contains usable sensible heat, which must be usefully recovered in order to provide a thermally efficient process.

In the present invention, the hot waste gas stream is processed by a novel method and apparatus, by means of which the sensible heat of the waste gas stream is utilized to concentrate residual liquor and also to heat process water. Another valuable result attained in the present invention is the removal and recovery of entrained solid chemical particles from the waste gas stream, by dissolving the solid particles in residual liquor during concentration of the residual liquor.

The hot waste gas stream derived from the combustion of residual liquor is passed downwards through a vertical passage which is broadly defined as having downwardly converging side walls, a throat section of restricted cross-section below the converging side walls, and downwardly diverging side walls below the throat section. A flow constricting baffle of triangular cross-section is disposed in the throat section, with its apex extending upwards and opposed to gas flow. In a preferred arrangement, the vertical passage is of generally circular cross-section, and is defined by an inverted truncated conical upper inlet section, a cylindrical throat section below the inlet section, and a truncated conical lower outlet section below the throat tsection, and a conical baffle is disposed in the cylindrical throat section with its apex extending upwards and opposed to gas flow. In any case, the hot waste gas stream is highly accelerated in velocity while flowing downwards through the vertical passage, with maximum velocity being attained in the throat section, due to flow passage construction provided by the baffle.

A recirculating residual liquor stream derived from the chemical digestion of cellulose-containing material, and containing various dissolved solids and chemicals as described supra, is flowed downwards on the downwardly converging side walls of the inlet section of the vertical passage. The residual liquor stream is thus projected into the hot waste gas stream and dispersed into liquid droplets, in extended-surface contact with the hot waste gas stream, while in the throat section of the vertical passage. This contact between the liquid droplets and the hot waste gas stream results in evaporation of water from the liquid droplets into the waste gas stream and concentration of the residual liquor. Thus, heat is usefully recovered from the waste gas stream. In addition, entrained solid chemical particles are dissolved into the liquid droplets from the waste gas stream. The resulting cooled waste gas stream is separated from the concentrated residual liquor stream, which is recycled to the vertical passage. A portion of the residual liquor stream is drawn off and burned in the steam boiler to produce steam and further hot waste gas, while dilute make-up residual liquor is added to the recirculating residual liquor.

Further heat is recovered from the waste gas stream discharged from the vertical passage, by passing this waste gas stream upwards through a contactor provided with a bed of packing, and countercurrent to a stream of process water which is thus heated. Water vapor is concomittantly condensed from the waste gas stream. The resulting cold waste gas stream, which is of greatly diminished volume due to condensation of water vapour, is then discharged.

In one embodiment of the present invention, the hot waste gas stream derived from the combustion of residual liquor is first contacted or scrubbed with concentrated residual liquor, which results primarily in the further concentration of the residual liquor due to evaporation of water vapor, thus producing a combustion-supporting residual liquor. A portion of this liquor is burned and the balance is recycled together with make-up dilute residual liquor, for further contact with hot waste gas. The resulting waste gas stream, now partially cooled, is further scrubbed in a second contact stage with dilute residual liquor, which results primarily in the essentially complete removal of entrained solid particles. The dilute residual liquor will also be concentrated to a minor extent, and the gas stream is further cooled. It has been determined that this two-stage scrub of the hot waste gas stream, first with concentrated liquor and then with dilute liquor, provides optimum results and improved efficiency in terms of heat recovery and removal of entrained solid particles from the waste gas stream. The resulting waste gas stream derived from the second stage contact with dilute residual liquor will usually be further contacted with process water as described supra, for further heat recovery as hot process water. In a preferred embodiment of the present invention, the hot waste gas stream is passed downwards in series through two of the vertical passages described supra. Concentrated residual liquor is employed for gas contact in the first vertical passage, while dilute residual liquor of lower viscosity is used in the second vertical passage for final removal of entrained solid chemical particles from the waste gas stream.

Several important advantages are attained in the present invention. A high efficiency of removal of entrained solid chemical particles from the waste gas stream is obtained, thus usually at least 90% to 99% of the total entrained solid chemical particles are recovered from the waste gas stream. Another advantage derives from the fact that a relatively lower pressure drop is produced in the waste gas stream in passing through the vertical passage, as compared to prior art contactors. Thus, a lower power expenditure is required for the fan which inducts the waste gas stream through the system. This is especially true when two vertical contact passages are employed in series as described supra, with the use of dilute residual liquor of lower viscosity in the second passage for final removal of entrained solid chemical particles. The use of dilute residual liquor of reduced viscosity for final solids removal results in a lowered resistance to gas flow, and concomitant lower gas pressure drop through the second vertical passage.

The employment of a gas contacting section following the vertical passage, in which the partially cooled waste gas stream is directly contacted with process water, is particularly advantageous. Further heat is recovered from the waste gas stream, in the form of hot process water. In addition, a substantial amount of water vapor is condensed from the waste gas stream, which results in a lower total gas volume and reduces the load or required capacity of the discharge fan. The final waste gas stream is generally discharged to a stack, and the removal of water vapor from the waste gas stream in the contact section by direct contact with process water results in the attainment of a nearly invisible stack plume, due to the elimination of atmospheric water vapor condensation. Thus, the general appearance of the facility is improved since a large stack plume is generally associated with air pollution. Finally, the method and apparatus of the present invention are advantageous because of the useful and substantially complete recovery of sensible heat and entrained solid chemical particles from the hot waste gas stream, which is attained in a novel and efficient manner.

It is an object of the present invention to concentrate residual liquor derived from the chemical digestion of cellulose-containing material in an improved manner.

Another object is to usefully recover heat and entrained solid chemical particles from the hot waste gas stream produced by combustion of concentrated residual liquor.

A further object is to contact residual liquor with the hot waste gas stream produced by the combustion of concentrated residual liquor in an improved manner, by dispersing residual liquor in the form of liquid droplets into the hot waste gas stream which is flowing downwards at high velocity through a novel vertical contact passage.

Still another object is to produce useful hot process water by recovery of heat from the waste gas stream produced by combustion of concentrated residual liquor.

Still a further object is to reduce the gas pressure drop during contact of residual liquor with the hot waste gas stream derived from combustion of concentrated residual liquor.

An additional object is to reduce the volume and water vapor content of the waste gas stream produced by the combustion of concentrated residual liquor, prior to discharge through an outlet fan.

An object is to provide an improved apparatus for the contact of residual liquor with the hot waste gas stream produced by the combustion of concentrated residual liquor.

These and other objects and advantages of the present invention will become evident from the description which follows. Referring to the figures, FIGURE 1 is an overall flow diagram showing preferred embodiments of the present invention in combination, and FIGURE 2 provides an isometric view of the apparatus of the present invention for contacting residual liquor with the waste gas stream produced by combustion of concentrated residual liquor.

Figure 2:
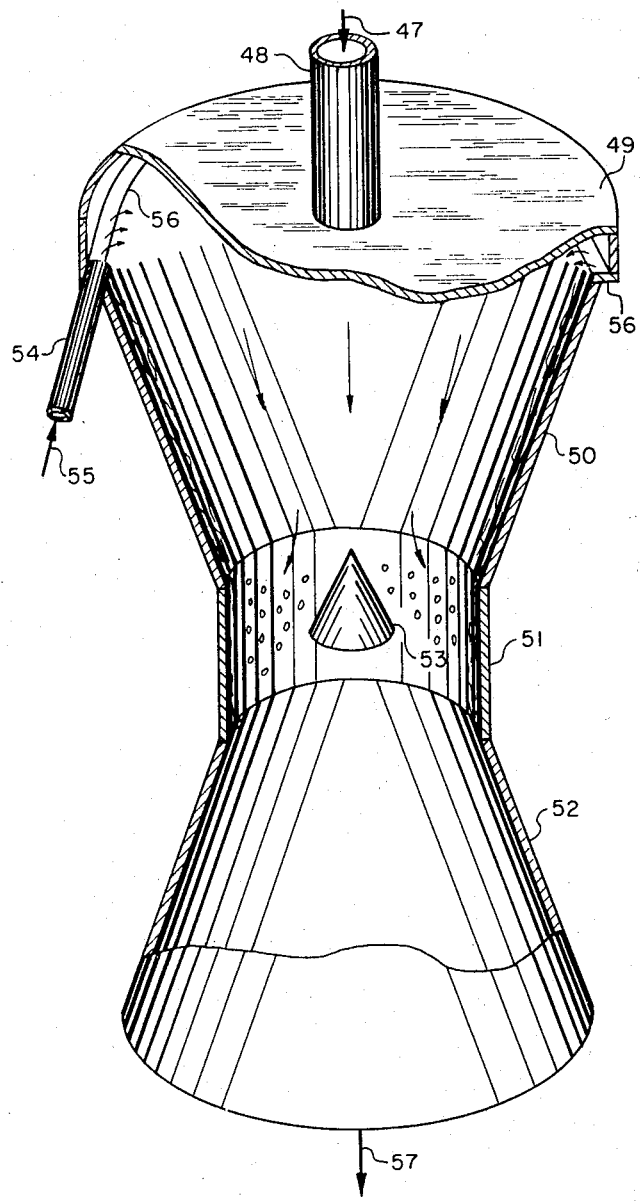

Referring now to FIGURE 1, concentrated residual liquor stream 1, typically containing from 60% to 68% dissolved solids content, is passed as a liquid fuel stream together with combustion air stream 2 into steam boiler 3, and is burned to generate a hot combustion gas stream. A major portion of the dissolved chemical salts in stream 2 collects in the bottom of unit 3 as a pool of molten salts, and is withdrawn via stream 4. The hot combustion gas rises through the tubes 5 of boiler 3, in heat exchange with liquid water stream 6, which is admitted into the shell of unit 3 and is heated and vaporized to yield usable process steam which is withdrawn from the shell of unit 3 via stream 7.

A hot waste gas stream 8 containing entrained solid chemical particles is removed from the upper section of unit 3, and is typically at a temperature in the range of 500° F. to 800° F. Stream 8 is passed downwards through a vertical passage defined by downwardly converging side walls 9, a throat section 10 of restricted cross-section and downwardly diverging side walls 11. A baffle 12 of triangular cross-section is disposed in the throat section 10, with the apex of baffle 12 extending upwards and opposed to gas flow. As mentioned supra, the vertical passage is preferably circular in horizontal cross-section. In this case, section 9 will consist of an inverted truncated conical upper inlet section, section 10 will consist of a cylindrical throat section, and section 11 will consist of a truncated conical lower outlet section. In addition, the baffle 12 will be conical with its apex extending upwards and opposed to gas flow.

The hot waste gas stream is highly accelerated in velocity while flowing downwards through sections 9 and 10. A recirculating concentrated residual liquor stream 13, typically of 60% to 68% dissolved solids content, is flowed downwards on the inner surface of walls 9 and is projected into the high velocity hot waste stream within throat section 10. The liquor stream is thus dispersed into liquid droplets within the waste gas stream, and is concentrated by evaporation of water into the gas stream, which is thereby partially cooled. In addition, a portion of the entrained solid chemical particles are dissolved from the waste stream into the liquid droplets.

The resulting mixed stream of partially cooled waste gas and liquid droplets now passes into separator section 14, which is provided to separate the liquid droplets phase as a lower pool of liquor from the waste gas. A baffle 15 may be suitably disposed in section 14, to assist in the separation of entrained liquid droplets. The concentrated residual liquor is withdrawn from the bottom of section 14 as stream 16. A make-up dilute residual liquor stream 17, typically of about 15% to 50% dissolved solids content, is added to stream 16, to compensate for the concentration effect of the gas-liquor contact in the vertical passage. The resulting combined concentrated residual liquor stream 18 now passes to circulating pump 19, and is discharged as stream 20 which is divided into liquid fuel stream 1 and recirculating concentrated residual liquor stream 13.

Referring now to separator section 14, the partially cooled waste gas is withdrawn as stream 21, and is typically at a temperature in the range of 180° F. to 220° F. Stream 21 is passed downwards through a vertical passage defined by downwardly converging side walls 22, a throat section 23 of restricted cross-section and downwardly diverging side walls 24. A baffle 25 of triangular cross-section is disposed in the throat section 23, with the apex of baffle 25 extending upwards and opposed to gas flow. As mentioned supra, the vertical passage is preferably circular in horizontal cross-section. In this case, section 22 will consist of an inverted truncated conical upper inlet section, section 23 will consist of a cylindrical throat section, and section 24 will consist of a truncated conical lower outlet section. In addition, the baffle 25 will be conical with its apex extending upwards and opposed to gas flow.

The partially cooled waste gas stream is highly accelerated in velocity while flowing downwards through sections 22 and 23. A recirculating dilute residual liquor stream 26, typically of 15% to 50% dissolved solids content, is flowed downward on the inner surface of walls 22 and is projected into the high velocity partially cooled waste gas stream within throat section 23. The liquor stream is thus dispersed into liquid droplets within the waste gas stream, and may be somewhat concentrated by evaporation of water into the waste gas stream, which thus may be further cooled, typically to a temperature in the range of 170° F. to 210° F. In addition, a major portion or substantially all of the entrained solid chemical particles are dissolved from the waste gas stream into the liquid droplets. Because of the low viscosity of dilute residual liquor stream 26, a minor resistance to gas flow and a relatively low gas pressure drop is encountered due to the gas-liquid contact in section 23. Thus, a relatively lower gas pressure drop is required for high removal of entrained particles from the waste gas stream.

The resulting mixed stream of further cooled waste gas and liquid droplets now passes into separator section 27, which is provided to separate the liquid droplets phase as a lower pool of liquor from waste gas. Baffles 28, 29 and 30 may be suitably disposed in section 27, to assist in the separation of entrained liquid droplets. The dilute residual liquor is withdrawn from the bottom of section 27 as stream 31. A make-up dilute residual liquor stream 32, derived from the chemical digestion of cellulose-containing material, is added to stream 31. The resulting combined dilute residual liquor stream 33 now passes to circulating pump 34, and is discharged as stream 35 which is divided into make-up dilute residual liquor stream 17 and recirculating dilute residual liquor stream 26.

The further cooled waste gas stream, typically at a temperature in the range of 170° F. to 210° F., now rises through the central opening in liquid retention plate 36 and around baffle 37. Plate 36 and baffle 37 are typical means provided to permit upwards gas flow while preventing downwards liquid flow. The waste gas stream next passes through bed support grid 38 and rises upward through packing bed 39. A stream 40 consisting of process water is dispersed onto bed 39, and flows downwards countercurrent to the rising waste gas phase. The waste gas stream is thus cooled with process water in bed 39. The process water is thereby heated, typically to a temperature in the range of 100° F. to 200° F. The resulting hot process water is collected on plate 36 and is discharged as hot water stream 41.

The finally cooled waste gas stream is now removed above bed 39 as stream 42, and is typically at a temperature in the range of 80° F. to 120° F. Stream 42 is relatively low in water vapor content due to the condensation of water vapor into the process water in bed 39. Stream 42 now passes through discharge fan 43, and then passes as stream 44 to stack 45, for final discharge to atmosphere as stream 46.

FIGURE 2 illustrates the preferred apparatus configuration of the present invention, for contacting residual liquor with hot waste gas derived from the combustion of concentrated residual liquor. The hot waste gas stream 47 passes downward through conduit 48, which discharges stream 47 downward through a central opening in circular cover plate 49. The waste gas stream now flows downward inside inverted truncated conical inlet duct 50, vertical cylindrical duct 51, and truncated conical lower outlet duct 52. A conical baffle 53 is mounted in duct 51, and the downflowing waste gas stream is highly accelerated in velocity while flowing downward inside ducts 50 and 51. A pipe 54 is disposed tangentially to conical baffle 50, and discharges residual liquor stream 55 onto horizontal shelf 56 with a component of flow direction tangential to duct 50. The residual liquor flows from shelf 56 into duct 50 and flows downward on the inner surface of duct 50. Due to the provision of a component of flow direction tangential to duct 50, the residual liquor follows a cyclonic flow path on the inner surface of duct 50. The residual liquor flows off the lower end of duct 50, and is projected into the high velocity waste gas stream inside duct 51 in the form of liquid droplets. The resulting mixed stream 57 consisting of waste gas and liquid droplets is discharged from the lower outlet end of duct 52, and is separated into the resulting residual liquor and waste gas components as described supra.

Numerous alternatives within the scope of the present invention will occur to those skilled in the art. Thus, the vertical passages for contact of residual liquor with waste gas have been described as preferably being of circular horizontal cross-section, and consisting of an upper inverted truncated conical inlet section, a cylindrical throat section of restricted cross-section, and a lower truncated conical outlet section. The vertical passages may alternatively be of rectangular horizontal cross-section, with two opposed sides being wider than the other two sides. In this case, the throat section would provide a narrow slit-like opening for gas passage, and the baffle in the throat section would be prismatic and of triangular cross-section. A functionally equivalent baffle configuration may be provided in the form of an inverted V-shaped baffle. In any case, the baffles 12 and 25 may be disposed in each instance with the apex of the baffle extending upwards into the inlet section. Thus, the apex of baffle 12 may extend into inlet section 9 and the apex of baffle 25 may extend into inlet section 22 in suitable instances, in order to promote more intimate contact between the waste gas stream and the downflowing residual liquor at the inlet to the throat sections 10 and 23 respectively.

Another alternative embodiment of the present invention involves the provision of a single vertical passage as described supra for contact of concentrated residual liquor with hot waste gas, in which case the make-up residual liquor derived from the chemical digestion of cellulose-containing material would be directly added to the recirculating concentrated residual liquor.

The bed 39 consists of packing such as spheres of Raschig rings. Other functionally equivalent gas-liquid direct contact means such as sieve trays may be provided, instead of bed 39.

When the hot waste gas stream is scrubbed in series, first with concentrated residual liquor and then with dilute residual liquor, other types of gas-liquid scrubbers or contactors may be employed instead of the vertical passage apparatus described supra. Typical alternative apparatus for this purpose could consist of conventional spray towers, the apparatus described in U.S. Patent Nos. 2,604,185 or 2,883,167, or their functional equivalents.

It will be appreciated that the dilute residual liquor stream 32 derived from the chemical digestion of cellulose-containing material may first be partially concentrated in multi-effect evaporators or similar equipment, prior to addition to stream 31. In addition, stream 17 may be partially concentrated in a steam heated multi-effect evaporator, prior to addition to stream 16.

Finally, the entry of gas streams 8 and 21 into the respective vertical passages may be horizontal rather than vertical, in which case the gas streams will change in flow direction within the vertical passages.

An example of an industrial application of the present invention will now be described.

EXAMPLE

The novel sequence of the present invention was applied to a commercial installation, handling black liquor from a wood pulp processing facility. Following are process conditions and stream compositions, for the various process streams. The volume flow rate of the waste gas stream is expressed in cubic feet per minute (c.f.m.), and the volume flow rate of liquid streams is expressed in gallons per minute (c.p.m.).

| Stream No. | Volume flow rate (g.p.m.) | Mass flow rate, pounds/minute | | | Temp., °F. |
|---|---|---|---|---|---|
| | | Total | Solids content | Water content | |
| 1 | 130 | 1,430 | 974 | 456 | 180 |
| 8 | ¹ 208,000 | 6,200.0 | 73.6 | 912.0 | 775 |
| 13 | 1,852 | 27,170.0 | 18,055.8 | 9,114.2 | 180 |
| 17 | 215 | 2,033.8 | 929.8 | 1,104.0 | 162 |
| 21 | ¹ 127,500 | 6,803.8 | 29.4 | 1,560.0 | 180 |
| 26 | 1,920 | 18,250.0 | 8,293.5 | 9,956.5 | 162 |
| 32 | 224 | 2,125.0 | 903.3 | 1,221.7 | |
| 40 | 3,150 | 26,300 | | 26,300 | 80 |
| 41 | 3,314.5 | 27,667.7 | | 27,667.7 | 150 |
| 42 | ¹ 90,000 | 5,527.3 | 2.9 | 310.0 | 110 |

¹ Cubic feet per minute.

In addition, the waste gas stream flowing from separator 27 through the central opening in liquid retention plate 36 was flowing at a rate of 135,500 c.f.m. at a temperature of 162° F. Total mass flow rate of this stream was 6895.0 pounds per minute, contained solids was 2.9 pounds per minute and contained water vapor was 1677.7 pounds per minute mass flow rate.

I claim:

1. A method for concentrating dilute residual black liquor derived from the chemical digestion of cellulose-containing material and containing the range of about 15% to 50% dissolved solids content, to produce a combustion-supporting concentrated liquor containing in the range of about 60% to 68% dissolved solids content, and concomitantly recovering heat and entrained solid chemicals particles from the hot waste gas stream produced by combustion of said concentrated liquor, which comprises burning a liquid fuel stream comprising concentrated residual black liquor containing in the range of about 60% to 68% dissolved solids content, whereby said hot waste gas stream containing entrained solid chemical particles is produced at a temperature in the range of 500° F. to 800° F., scrubbing said hot waste gas stream with concentrated residual black liquor containing in the range of about 60% to 68% dissolved solids content, whereby water is evaporated from said concentrated residual liquor and said waste gas stream is cooled to a temperature in the range of 180° F. to 220° F., separating the resulting concentrated residual black liquor from the cooled waste gas stream, recycling a portion of the concentrated residual black liquor for further scrubbing of said hot waste gas stream, burning the balance of said concentrated residual liquor as said liquid fuel stream, further scrubbing the cooled waste gas stream containing entrained solid chemicals particles with dilute residual black liquor containing in the range of about 15% to 50% dissolved solids content, whereby entrained solid particles are removed from the waste gas stream and pass into said dilute residual liquor, separating the resulting dilute residual black liquor from the substantially solids-free cooled waste gas stream, recycling a portion of the resulting dilute residual black liquor for further scrubbing of said cooled solids-laden waste gas stream, adding the balance of said resulting dilute residual black liquor to said concentrated residual liquor, and adding makeup dilute residual black liquor derived from the chemical digestion of cellulose-containing material and containing in the range of about 15% to 50% dissolved solids content to said resulting dilute residual black liquor.

2. A method for separately recovering heat and entrained solid chemical particles from the hot waste gas stream produced at a temperature in the range of 500° F. to 800° F. by the combustion of concentrated residual black liquor containing in the range of about 60% to 68% dissolved solids content and derived from the chemical digestion of cellulose-containing material, which comprises passing said hot waste gas stream vertically downwards through a first vertically oriented venturi contactor, passing a stream of concentrated residual black liquor containing in the range of about 60% to 68% dissolved solids content downwards on the inner surface of the upper inlet section of said first venturi contactor, whereby said concentrated residual liquor stream is projected into said hot waste gas stream in the throat of said first venturi contactor, said hot waste gas stream is thereby cooled to a temperature in the range of 180° F. to 220° F., and said concentrated residual liquor stream is further concentrated within the range of about 60% to 68% dissolved solids content, separating the concentrated residual black liquor from the cooled waste gas stream, burning a portion of said concentrated residual liquor stream to produce said hot waste gas stream, passing the cooled waste gas stream vertically downwards through a second vertically oriented venturi contactor, passing a stream of dilute residual black liquor containing in the range of about 15% to 50% dissolved solids content downwards on the inner surface of the upper inlet section of said second venturi contactor, whereby said dilute residual liquor stream is projected into said cooled waste gas stream in the throat of said second venturi contactor, and entrained solid chemical particles are absorbed from said waste gas stream into said dilute residual liquor, separating the resulting dilute residual liquor from the scrubbed waste gas stream, adding a portion of the resulting dilute residual liquor containing in the range of about 15% to 50% dissolved solids content to said concentrated residual liquor stream, and adding make-up dilute liquor derived from the chemical digestion of cellulose-containing material and containing in the range of about 15% to 50% dissolved solids content to said dilute residual liquor stream.

3. An apparatus for concentrating residual liquor derived from the chemical digestion of cellulose-containing material, to produce a combustion-supporting concentrated liquor, and concomitantly recovering heat and chemicals from the hot waste gas produced by combustion of said concentrated liquor, which comprises means to burn a liquid fuel stream comprising concentrated residual liquor, whereby a hot waste gas stream containing entrained solid chemical particles is produced; a vertically disposed inverted truncated conical inlet duct; a vertical cylindrical duct of restricted cross-section depending downwards from said inlet duct; a vertically disposed truncated conical outlet duct depending downwards from said cylindrical duct; a conical baffle centrally disposed in said cylindrical duct, with the apex of said baffle extending upwards; means to pass said hot waste gas stream from said fuel burning means downwards through said inlet duct, whereby said hot waste gas stream is accelerated in velocity within said cylindrical duct; means to flow a recycling residual liquor stream downwards on the inner surface of said inlet duct, whereby said residual liquor stream is projected into said hot waste gas stream in said cylindrical duct and is dispersed into liquor droplets, and is thereby concentrated by evaporation of water into said hot waste gas stream, and whereby entrained solid chemical particles in said waste gas stream are dissolved into said liquid droplets; means to separate the resulting cooled waste gas stream from the resulting concentrated residual liquor stream; means to recycle said concentrated residual liquor stream to said inlet duct; and means to add make-up dilute residual liquor to said recycling concentrated residual liquor stream.

4. An apparatus for concentrating dilute residual liquor derived from the chemical digestion of cellulose-containing material, to produce a combustion-supporting concentrated liquor, and concomitantly recovering heat and entrained solid chemicals particles from the hot waste gas stream produced by combustion of said concentrated liquor, which comprises means to burn a liquid fuel stream comprising concentrated residual liquor, whereby a hot waste gas stream containing entrained solid chemical particles is produced; a first vertically disposed inverted truncated conical inlet duct; a first vertical cylindrical duct of restricted cross-section depending downwards from said first inlet duct; a first vertically disposed truncated conical outlet duct depending downwards from said first cylindrical duct; a first conical baffle centrally disposed in said first cylindrical duct, with the apex of said first baffle extending upwards; means to pass said hot waste gas stream from said means to burn a liquid fuel stream to and downwards through said first inlet duct, whereby said hot waste gas stream is accelerated in velocity within said first cylindrical duct; means to flow a recycling concentrated residual liquor stream downwards on the inner surface of said first inlet duct, whereby said concentrated residual liquor stream is projected into said hot waste gas stream in said first cylindrical duct and is dispersed into liquid droplets, and is thereby concentrated by evaporation of water into said hot waste gas stream; means to separate the resulting partially cooled waste gas stream from the resulting concentrated residual liquor stream; means to recycle a major portion of said concentrated residual liquor stream to said first inlet duct; means to pass the balance of said concentrated residual liquor stream to combustion in said means to burn a liquid fuel stream; means to add make-up dilute residual liquor to said recycling concentrated residual liquor stream; a second vertically disposed inverted truncated conical inlet duct; a second vertical cylindrical duct of restricted cross-section depending downwards from said second inlet duct; a second vertically disposed truncated conical outlet duct depending downwards from said second cylindrical duct; a second conical baffle centrally disposed in said second cylindrical duct, with the apex of said second baffle extending upwards; means to pass said partially cooled waste gas from said separation means to and downwards through said second inlet duct, whereby said partially cooled waste gas stream is accelerated in velocity within said second cylinddical duct; means to flow a recycling dilute residual liquor stream downwards on the inner surface of said second inlet duct, whereby said dilute residual liquor stream is projected into said partially cooled waste gas stream in said second cylindrical duct and is dispersed into liquid droplets, and whereby a major portion of the entrained solid chemical particles in said waste gas stream is dissolved into said liquid droplets; means to separate the resulting further cooled waste gas stream from the resulting dilute residual liquor stream; means to recycle a major portion of said resulting dilute residual liquor stream to said second inlet duct; means to add make-up dilute residual liquor derived from the chemical digestion of cellulose-containing material to said recycling dilute residual liquor stream; and means to add a portion of said recycling dilute residual liquor stream to said concentrated residual liquor stream as said make-up dilute residual liquor.

References Cited

UNITED STATES PATENTS

| | | |
|---|---|---|
| 2,604,185 | 7/1952 | Johnstone et al. _____ 55—237 X |
| 2,879,838 | 3/1959 | Flynt et al. |
| 3,212,235 | 10/1965 | Markant. |
| 3,299,942 | 1/1967 | Jacoby. |

S. LEON BASHORE, *Primary Examiner.*

R. D. BAJEFSKY, *Assistant Examiner.*

U.S. Cl. X.R.

23—48; 159—49; 162—30